April 27, 1954 — F. S. MALICK — 2,677,088
MAGNETIC AMPLIFIER FOR CONTROLLING THE
VOLTAGES APPLIED TO MOTOR ARMATURES
Filed Aug. 9, 1952 — 2 Sheets-Sheet 1

WITNESSES:
John E. Hensley
Wm. R. Sellers

INVENTOR
Franklin S. Malick.
BY
Paul E. Friedmann
ATTORNEY

INVENTOR
Franklin S. Malick

Patented Apr. 27, 1954

2,677,088

UNITED STATES PATENT OFFICE 2,677,088

MAGNETIC AMPLIFIER FOR CONTROLLING THE VOLTAGES APPLIED TO MOTOR ARMATURES

Franklin S. Malick, Annapolis, Md., assignor to Westinghouse Electric Corporation, East Pittsburgh, Pa., a corporation of Pennsylvania Application August 9, 1952, Serial No. 303,472

6 Claims. (Cl. 318—257)

1

My invention relates to electric control systems, and more particularly to the use of magnetic amplifiers for the control of the operation of direct current electric motors.

When it is desired to reverse the direction of rotation of a shunt excited, or separately excited, direct current motor, supplied with energy for its armature winding from magnetic amplifiers, some special difficulties arise. A pair of balanced type of magnetic amplifiers can be fairly readily connected to reverse the direction of current flow in a resistance load unit or an inductive load unit, but cannot by a similar simple circuit be connected to reverse the direction of current flow in a generative load such as the armature of a direct current motor. In such a balanced circuit if one pair of magnetic amplifiers is controlled to cause current to flow through the armature in one sense, then the rectifiers in series with the other magnetic amplifier will short out the motor armature voltage.

It is one broad object of my invention to obtain proportional armature voltage control of a direct current motor by the use of magnetic amplifiers and without using relays, or contactors, to provide a drive for some interposed position servomechanism.

It is also a broad object to provide speed control, by means of the use of magnetic amplifiers, for direct current motors.

A more specific object of my invention is the provision for varying the voltage across the armature to vary the motor speed and of switching from one field winding to the other to reverse the direction of operation of the motor, by the use of magnetic amplifiers only and without the use of magnetic contactors, or relays.

The objects expressed are merely illustrative. Other objects and advantages will become more apparent from a study of the following specification and the accompanying drawings, in which.

Figure 1:
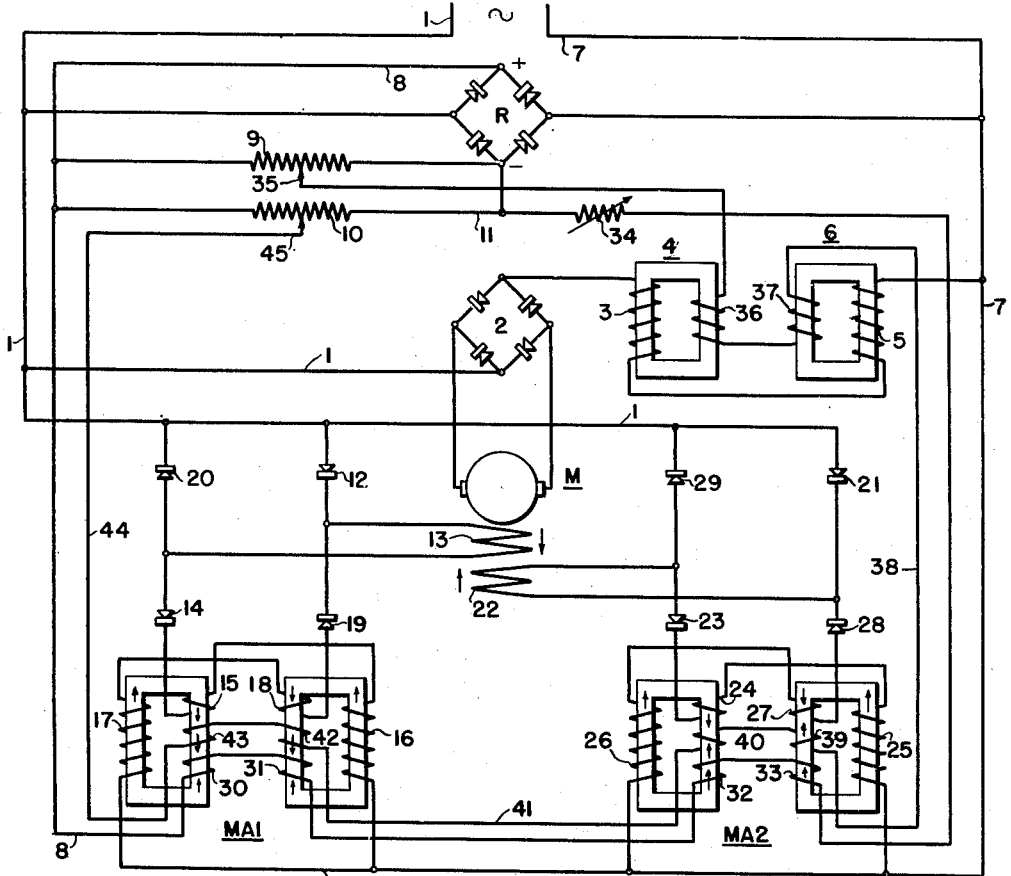
Figure 1 is a diagrammatic showing of my invention in its simplest aspects.

In Fig. 1, the full wave rectifier 2 and the main coils 3 and 5 of the reactors 4 and 6, respectively, are shown connected directly across the alternating current supply leads 1 and 7. The reactors 4 and 6 are simple reactors without feedback. The output of these reactors is thus rectified by the rectifier 2 so that a direct current voltage is supplied to the armature terminals of the motor

2 which is connected to the direct current terminals of the rectifier.

The output characteristic of the simple reactor magnetic amplifiers 4 and 6 is such that the current supplied to the armature terminal of motor M is proportional to the current in the control windings 36 and 37. The current in the control windings 36 and 37 is proportional to the position error, or intelligence signal, and may be obtained directly from a bridge circuit as shown or from a magnetic amplifier. I use the simple reactors 4 and 6 because the output increases regardless of the direction of the current through the control windings 36 and 37.

The full wave rectifier R has its alternating current terminals connected directly to the leads 1 and 7, respectively. The direct current load for this rectifier consists of the two parallel connected potentiometers 9 and 10. The circuit for the potentiometers may be traced from the positive conductor 8 through potentiometers 9 and 10, to the negative conductor 11.

The magnetic amplifier MA1 energizes the field winding 13 of the motor M. The field circuit, for one-half wave, may be traced from conductor 1 through rectifier 12, the field winding 13 energized in the sense shown by the arrow adjacent to the field winding, rectifier 14, feedback winding 15, main winding 16 to the conductor 7. For the second half wave the field circuit may be traced from conductor 7, through the main winding 17, feedback winding 18, rectifier 19, field winding 13 and rectifier 20 to conductor 1.

The magnetic amplifier MA2 energizes the field winding 22 of the motor M and for one half wave the energizing circuit may be traced from conductor 1 through rectifier 21, field winding 22 energized as indicated by the arrow adjacent the field winding in a sense opposite to the energization of field winding 13, rectifier 23, feedback winding 24, main winding 25 to conductor 7. For the second half wave the circuit may be traced from conductor 7 through the main winding 26, feedback winding 27, rectifier 28, field winding 22, and rectifier 29 to the conductor 1.

The magnetic amplifiers each have biasing windings. The biasing circuit may be traced from positive conductor 8 through bias windings 30 and 31 of the magnetic amplifier MA1, bias windings 32 and 33 of magnetic amplifier MA2 and bias adjusting rheostat 34 to the negative conductor 11.

The control windings 36 and 37 are energized from the potentiometers 9 and 10. The circuit may be traced from the adjustable lead 35 on the potentiometer 9 through the control windings 36 and 37 of the reactors 4 and 6, respectively, conductor 38, control windings 39 and 40 of the magnetic amplifier MA2, conductor 41, control windings 42 and 43 of the magnetic amplifier MA1, and conductor 44 to the adjustable lead 45 on potentiometer 10.

The position of the adjustable leads 35 and 45, as shown, is such that the circuit for the control windings is connected at balanced points of the bridge circuit the potentiometers provide. This means the field currents in the two fields is substantially zero because the error current is zero. This will be apparent from an inspection of Fig. 3.

If the adjustable lead 35 is moved to the left on potentiometer 9, making lead 35 more positive than lead 45, then an energized circuit is established from the positive lead 35 through control windings 36 and 37 of the reactors 4 and 6, respectively, conductor 38, control windings 39 and 40 of the magnetic amplifier MA2, conductor 41, control windings 42 and 43 of the magnetic amplifier MA1 and conductor 44 to the negative adjustable lead 45.

From an inspection of the winding relations of the windings on the respective magnetic amplifiers, clarified by the arrows adjacent the windings, it is apparent that the control, or error, current in the magnetic amplifier MA2 opposes saturation with the result that field winding 22 is not energized. In terms of Fig. 3 the error current moves to the right let us say. The counterclockwise field 22 thus remains at substantially zero excitation.

From an inspection of the winding relations of the windings on the magnetic amplifier MA1, it is apparent that an entirely different condition obtains. The control winding magnetizes the amplifier in the direction of saturation. In terms of Fig. 3, the error current still moves to the right and the clockwise field 13 is energized with triggering action. The operation is substantially equivalent to a switching action and yet I need not use any contactor, or relay.

The motor thus starts driving its load, the speed stabilizing at a given value depending on the load on the motor, the excitation of the field 13, and on the extent of the movement of the lead 35 to the left. If the lead 35 is moved to the extreme left on potentiometer 9 and still more armature voltage control is desired, the lead 45 may be moved to the right. In fact, the leads 35 and 45 may be so mechanically coupled to each other and with respect to their respective potentiometers that lead 45 moves to the right, from the balanced position on the potentiometer an equal amount to the movement of lead 35 to the left from the balanced position on its potentiometer.

When the leads 35 and 45 are moved to the right and left, respectively, then the counterclockwise field 22 is energized with trigger action, and the speed control, by armature voltage control through the reactors 4 and 6 proceeds as before. The reactors 4 and 6, being simple proportional reactors, effect an increase in voltage on the motor armature terminal with an increase in the current in control windings 36 and 37 regardless of the direction of the control current.

In practice, the feedback windings are so picked and adjusted that the magnetic amplifiers operate with a snap action, that is, connect the field windings for excitation or nonexcitation, as the case may be, as if switches had been used. Further, the sense and magnitude of the bias current is adjusted so that one field switches on when the other field switches off.

Figure 3:
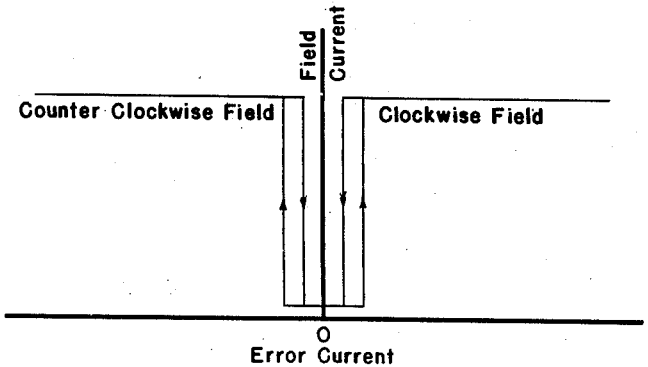
Fig. 3 shows some curves illustrating some features of my contribution to the art.

If, as shown, the motor is to be operated with a minimum power consumption, the bias current is adjusted so that both fields are off, as is seen from Fig. 3, when the error current is small. By connecting the control windings in series, I make certain that one field is off when the other is on, if the bias is adjusted as shown in Fig. 3.

The leads 35 and 45 need not be operated manually but the error current variations, namely the movements of leads 35 and 45, may be made automatically responsive to some operating condition of the system. If a large position error occurs, namely if the control current is changed a large extent, then the field which causes the motor to run in the direction to reduce the error is snapped on and a large voltage is applied to the armature to cause the motor to run at a high speed. As the control current is reduced, the speed is reduced. If there is a considerable inertia load, the arrangement may be such that the motor will coast past the zero error position so that the field which causes the motor to run in the opposite direction will be switched on and the original field switched off.

Figure 2:
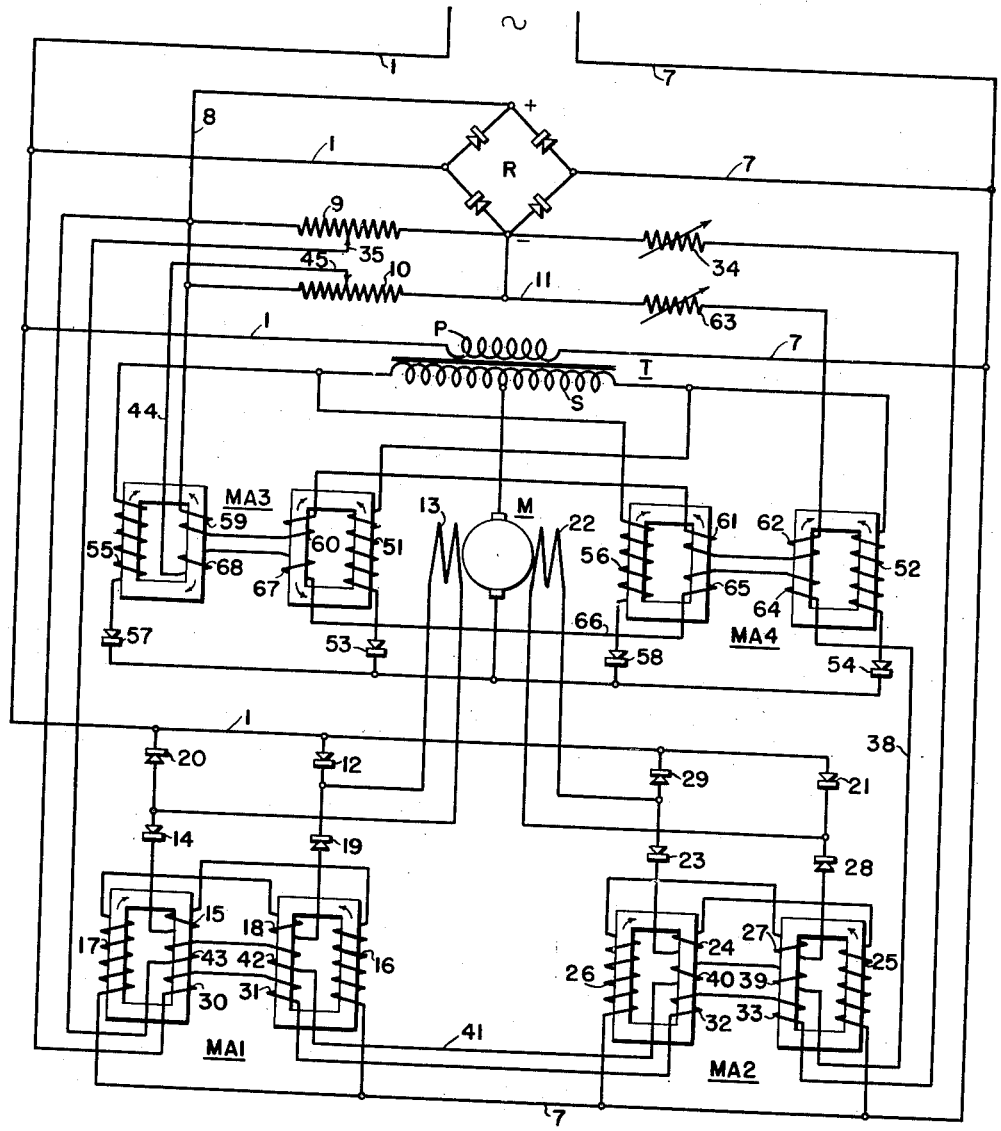
Fig. 2 is a somewhat more elaborate diagrammatic showing of my invention.

In the showing in Fig. 2, I do not use a simple linear or proportional reactor but use a pair of self-saturating magnetic amplifiers to get the same linear armature control effect.

In Fig. 2, the primary P of transformer T is connected across the leads 1 and 7. The secondary S supplies the magnetic amplifiers MA3 and MA4 and the motor M. The motor has one armature terminal connected to a mid-tap on the secondary S and the other armature terminal is connected to the positive terminals of the magnetic amplifiers MA3 and MA4.

When the right-hand terminal of the secondary S is positive, the current flows through windings 51 and 52 and rectifiers 53 and 54 to the bottom armature terminal of the motor. When the left-hand terminal of secondary S is positive, the current flows through windings 55 and 56 and rectifiers 57 and 58 to the bottom armature terminal of the motor.

The bias windings are connected in a circuit that may be traced from positive lead 8 through windings 59 and 60 of magnetic amplifier MA3, windings 61 and 62 of magnetic amplifier MA4, and bias adjusting rheostat 63 to the negative lead 11.

The control windings of the magnetic amplifiers MA3 and MA4 are connected in series with the control windings of the magnetic amplifiers MA1 and MA2. The circuit for the control windings may be traced from lead 35 through control windings 43 and 42 of the amplifier MA1, conductor 41, control windings 40 and 39 of amplifier MA2, conductor 38, control windings 64 and 65 of amplifier MA4, conductor 66, control windings 67 and 68 of amplifier MA3, and conductor 44 to adjustable lead 45.

While I have shown and described but two embodiments of my invention, it is to be understood that still other modifications and adaptations may be made within the spirit of my invention.

I claim as my invention:

1. In an electric system of control, in combination, a direct current motor having an armature winding, a first field winding for effecting rotation of the motor in one direction, a second field winding for effecting rotation of the motor in a reverse direction, a pair of supply terminals energized with alternating current, a triggering magnetic amplifier having main windings and feedback windings connected in series with the first field winding and connected to said terminals, a second triggering magnetic amplifier having main windings and feedback windings connected in series with the second field winding and connected to said terminals, a linear magnetic amplifier having main coils, a full wave rectifier having its alternating current junctions connected in series with the main coils and connected to said terminals, the motor armature being connected across the direct current junctions of said rectifier, control windings on each of said magnetic amplifiers all connected in series whereby current flow in said control windings will cause voltage to be applied to the motor armature and one or the other field windings energized depending on the direction of current flow in the control windings.

2. In electric systems of control for direct current motors, in combination, a direct current motor having an armature winding and two field windings, a pair of supply terminals energized with alternating current, a rectifier and linear magnetic amplifier interconnected with said armature winding and connected to said terminals to effect energization of the armature winding in proportion to the saturation of the linear magnetic amplifier, a triggering magnetic amplifier for each field winding connected to said terminals, control windings for each of said amplifiers all connected in series to thus, upon energization of the control windings, simultaneously control the magnitude of the excitation of the motor armature and the selective energization of said field windings.

3. In electric systems of control for direct current motors, in combination, a direct current motor having an armature winding and two field windings, a pair of supply terminals energized with alternating current, a rectifier and linear magnetic amplifier interconnected with said armature winding and connected to said terminals to effect energization of the armature winding in proportion to the saturation of the linear magnetic amplifier, a triggering magnetic amplifier for each field winding connected to said terminals, control windings for each of said amplifiers all connected in series, means for energizing said control windings at any selected magnitude and either positively or negatively, whereby the linear magnetic amplifier effects the energization of the armature proportional to said selected magnitude of the energization of the control windings and whereby one of said triggering magnetic amplifiers, depending on the direction of the current flow in the contol windings, effects the energization of one of the field windings.

4. In an electric system of control, in combination, a pair of supply terminals energized with alternating current, a saturable reactor having a main winding and a saturating winding, a full wave rectifier having its alternating current junctions connected in series with the main windings, said rectifier and main windings being connected to said terminals, a direct current motor having an armature connected to the direct current junctions of the rectifier, and having two field windings, triggering magnetic amplifiers for selectively energizing said field windings, control windings for each of said triggering magnetic amplifiers, a control circuit including said control windings and reactor saturating windings, and means for selectively energizing said control circuit either positively or negatively to thus effect the selective energization of one or the other field winding and to effect the energization of the motor armature in accordance with the saturation of the reactor.

5. In an electric system of control, a linear magnetic amplifier including a saturating winding, a main winding and rectifying means energized with alternating current, a direct current load connected to the rectifying means, said load including two exciting circuits, a triggering magnetic amplifier for each exciting circuit, each of said triggering magnetic amplifiers including main windings and rectifying means, one of said exciting circuits excited with alternating current, and including a control winding, means for simultaneously varying the current in said control windings and saturating winding selectively from a zero value to a selected positive or negative value to thus effect proportional energization of said direct current load and selective energization of either of said exciting circuits.

6. In an electric system of control, a linear magnetic amplifier including a saturating winding, a main winding and rectifying means energized with alternating current, a direct current load connected to the rectifying means, said load including two exciting circuits, a triggering magnetic amplifier for each exciting circuit, each of said triggering magnetic amplifiers including main windings and rectifying means, feedback windings for effecting a relatively high degree of positive feedback, one of said exciting circuits excited with alternating current, and including a control winding, means for simultaneously varying the current in said control windings and saturating winding selectively from a zero value to a selected positive or negative value to thus effect proportional energization of said direct current load and selective energization of either of said exciting circuits.

References Cited in the file of this patent

UNITED STATES PATENTS

| Number | Name | Date |
|---|---|---|
| 2,518,865 | Cartotto | Aug. 15, 1950 |
| 2,571,708 | Graves | Oct. 16, 1951 |
| 2,632,877 | Ogle | Mar. 24, 1953 |